(12) United States Patent
Johnson et al.

(10) Patent No.: US 8,898,673 B2
(45) Date of Patent: *Nov. 25, 2014

(54) METHODS, SYSTEMS, AND PRODUCTS FOR STREAM WAREHOUSING

(71) Applicant: AT&T Intellectual Property I, L.P., Atlanta, GA (US)

(72) Inventors: Theodore Johnson, New York City, NY (US); Vladislav Shkapenyuk, New York City, NY (US); Lukasz Golab, Morris Plains (CA)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,549

(22) Filed: Apr. 29, 2013

(65) Prior Publication Data

US 2013/0238547 A1   Sep. 12, 2013

Related U.S. Application Data

(63) Continuation of application No. 12/950,730, filed on Nov. 19, 2010, now Pat. No. 8,453,155.

(51) Int. Cl.
*G06F 9/46* (2006.01)
*G06F 9/50* (2006.01)
*G06F 17/30* (2006.01)

(52) U.S. Cl.
CPC ............ *G06F 17/30589* (2013.01); *G06F 9/50* (2013.01); *G06F 2209/5017* (2013.01); *G06F 9/5027* (2013.01); *G06F 2209/501* (2013.01)
USPC .......................................... 718/104; 718/102

(58) Field of Classification Search
None
See application file for complete search history.

(56) References Cited

U.S. PATENT DOCUMENTS

| | | | |
|---|---|---|---|
| 6,055,491 A | 4/2000 | Biliris et al. |
| 6,141,655 A | 10/2000 | Johnson et al. |
| 6,216,125 B1 | 4/2001 | Johnson |
| 6,219,800 B1 | 4/2001 | Johnson |
| 6,289,415 B1 | 9/2001 | Johnson |
| 6,334,125 B1 | 12/2001 | Johnson |
| 6,393,516 B2 | 5/2002 | Johnson |
| 6,424,967 B1 | 7/2002 | Johnson |
| 6,539,391 B1 | 3/2003 | DuMouchel et al. |
| 6,591,272 B1 | 7/2003 | Williams |
| 6,725,446 B1 | 4/2004 | Hahn et al. |
| 6,728,713 B1 | 4/2004 | Beach et al. |
| 7,024,428 B1 | 4/2006 | Huang et al. |
| 7,139,779 B1 | 11/2006 | Kornelson et al. |

(Continued)

OTHER PUBLICATIONS

Golab, L. Johnson, T., Shkapenyuk, V., Scheduling Updates in a Real-time Stream Warehouse, ICDE '09. IEEE International Conference on Data Engineering, Mar. 29, 2009-Apr. 2, 2009; pp. 1207-1210.

(Continued)

*Primary Examiner* — Van Nguyen
(74) *Attorney, Agent, or Firm* — Scott P. Zimmerman, PLLC

(57) ABSTRACT

Methods, systems, and products schedule updates to stream warehouses. A plurality of execution tracks are allocated in memory, with each execution track assigned a portion of utilization of a processor and a proportionate portion of the memory. A home track is also defined in the plurality of execution tracks. When the home track is unavailable, then a different track in the plurality of execution tracks is selected, and a database update job is dispatched to the different track.

20 Claims, 7 Drawing Sheets

(56) References Cited

U.S. PATENT DOCUMENTS

| | | |
|---|---|---|
| 7,165,100 B2 | 1/2007 | Cranor et al. |
| 7,451,214 B1 | 11/2008 | Cranor et al. |
| 7,536,396 B2 | 5/2009 | Johnson et al. |
| 7,599,968 B2 | 10/2009 | Pagnussat et al. |
| 7,668,800 B2 | 2/2010 | Motoyama et al. |
| 7,689,863 B1 | 3/2010 | Korensvsky et al. |
| 7,805,266 B1 | 9/2010 | Dasu et al. |
| 7,831,711 B2 | 11/2010 | Cranor et al. |
| 7,882,087 B2 | 2/2011 | Johnson |
| 2004/0128195 A1 | 7/2004 | Sorem |
| 2005/0055368 A1 | 3/2005 | Bruening et al. |
| 2008/0229313 A1 | 9/2008 | Motoyama et al. |

OTHER PUBLICATIONS

Babcock, B., Babu, S., Datar, M., Motwani, R., Windon, J., Models and issues in data stream systems, In PODS '02: Proceedings of the twenty-first CM SIGMOND-SIGACT-SIGART symposium on Principles of database systems (2002), pp. 1-16.

Simitsis, A., Vassiliadis, P., Sellis, T., Optimizing ETL Processes in Data Warehouses, ICDE, pp. 564-575, $21^{st}$ International Conference on Data Engineering (ICDE '05), 2005.

Nguyen, T.M., Tjoa, A.M.: Zero-latency data warehousing for heterogeneous data sources and continuous data streams. In: Proceedings of the Fifth International Conference on Information and Web-based Applications & Services (iiWAS 2003) (Sep. 2003), 11 pages.

METHODS, SYSTEMS, AND PRODUCTS FOR STREAM WAREHOUSING

CROSS-REFERENCE TO RELATED APPLICATIONS

This application is a continuation of U.S. application Ser. No. 12/950,730, filed Nov. 19, 2010, now issued as U.S. Pat. No. 8,453,155, and incorporated herein by reference in its entirety.

FIELD OF THE DISCLOSURE

The present disclosure relates to scheduling data updates and, specifically, to scheduling data updates in a streaming data warehouse.

BACKGROUND

Update jobs may be received by a streaming data warehouse as continuous data streams that are processed while append data is still arriving. Multiple data streams may be received and processed simultaneously. Streaming data warehouses that process update jobs using conventional resource allocation techniques may experience performance degradation that can result in undesirable and unnecessary levels of data staleness.

DESCRIPTION OF THE EMBODIMENT(S)

Figure 1:
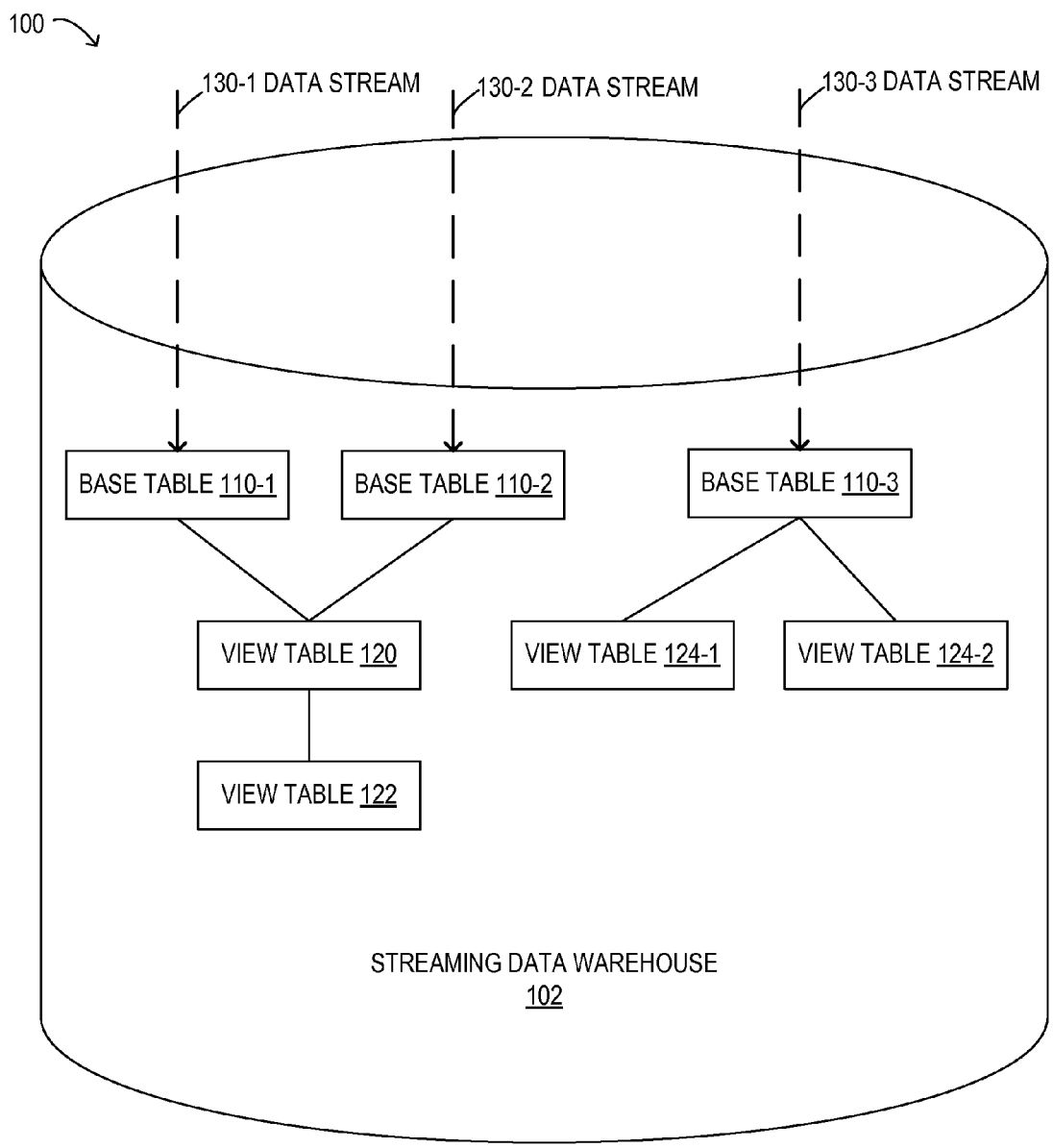
FIG. 1 is a block diagram of a database system according to the prior art.

In one aspect, a disclosed method for scheduling database updates includes allocating a plurality of execution tracks configured to execute database update jobs on the database, and associating a database table with a home track included in the plurality of execution tracks. Each execution track may be assigned a portion of processor resources and a portion of memory resources. The method may further include receiving an update job directed to a database table such as a Base table or a View table. The update job may include append data for the database table. When the home track is available, the method may include dispatching the update job for execution on the home track. When the home track is not available, the method may include dispatching the update job for execution on a second track different from the home track. The second track may be one of the plurality of execution tracks. The plurality of execution tracks may be configured to execute update jobs as atomic operations that are not preempted.

In particular embodiments, the method may include sorting received update jobs using a sorting algorithm prior to dispatching update jobs for execution. The method may include selecting a next update job according to an order determined by the sorting algorithm. The sorting algorithm may perform any of the following: sorting update jobs with respect to corresponding database table priorities, sorting update jobs with respect to an amount of data, sorting update jobs with respect to an expected processing effort, sorting update jobs with respect to an expected execution time, sorting update jobs with respect to a corresponding database table freshness/staleness, combining update jobs directed to common database tables into a single update job, or separating previously combined update jobs. Separating previously combined update jobs may include separating previously combined update jobs in response to a backlog of update jobs directed to respective database tables having a low update priority.

In certain embodiments, the method may further include selecting the second track based on any of the following criteria: a workload associated with the second track, the portion of processor resources assigned to the second track, and the portion of memory resources assigned to the second track. The method may further include executing an update job for a Base table and subsequently updating View tables that depend on the updated Base table.

In another aspect, a disclosed database system for scheduling update jobs includes a processor configured to access memory media and a database partition accessible to the processor. The memory media may include processor executable instructions to allocate execution tracks that execute update jobs on objects in the database partition and assign a Base object in the database partition a home track included in the plurality of execution tracks. Each execution track may be assigned a portion of processor utilization resources and a portion of memory resources. The processor instructions may further be executable to receive an update job directed to the Base object. The update job may include append data for the Base object, and the update job may be one of a continuous data stream of update jobs directed to objects in the database partition. When the home track is available, the processor instructions execute the update job on the home track. When the home track is not available, the processor instructions to execute the update job on a track other than the home track. The plurality of execution tracks may be prohibited from preempting executing update jobs.

In various embodiments, the processor executable instructions to receive the update job may further include instructions to sort the received update job with respect to other received update jobs using a sorting algorithm and select a next update job for execution according to a sorted order based on the sorting algorithm. The sorting algorithm may sort update jobs based on predetermined object priorities, the amount of data associated with each update job, a freshness/staleness of the objects, the processing effort expected for each update job, whether measured in terms of expected execution time or expected processing cycles, or another suitable factor. Update jobs directed to common database objects may be combined into a single update job. Conversely, previously combined update jobs, may be separated or divided when, for example, there is a backlog of update jobs for low priority database objects.

In some embodiments, the instructions to execute an update job on a different track may include instructions to select a second track based on any of the following: a workload associated with the second track, processor resources allocated to the second track, and memory resources allocated to the second track. The instructions to execute an update job for a first database object may include instructions to update a set of one or more second database objects that depend on, are derived from, or are otherwise affected by the update to the first database object.

In yet another aspect, disclosed computer-readable memory media include instructions for scheduling update jobs to a streaming data warehouse. When executed, the instructions may create a plurality of execution tracks for executing update jobs on the streaming data warehouse and assign one of the execution tracks to a database table as the table's home track. Each execution track may be assigned an amount of available processing resources, including an amount of processor utilization and an amount of memory. The instructions may further be executable to receive an update job directed to the database table, where the update job includes append data for the table. When an expected execution delay for the home track exceeds a predetermined threshold, the update job may be executed on a different one of the execution tracks, i.e., an execution track different from the home track. Some embodiments may incorporate a scheduling policy that prevents or prohibits preempting update jobs directed to the streaming data warehouse.

In some embodiments, when the expected execution delay for the home track is less than the predetermined threshold, the update job may be executed on the home track. Update jobs may be sorted with respect to other update jobs using a sorting algorithm to identify a next update job for execution from among the received update jobs according an order determined by the sorting algorithm. The sorting algorithm may combine update jobs directed to common database tables into a single update job, separate previously-combined update jobs, or both. Separating previously combined update jobs may be encouraged when, for example, a backlog of update jobs directed to low priority Base tables exists.

The instructions to execute an update job on a second track may select the second track based on a workload associated with the second track, the amount of processing resources assigned to the second track, or a combination of the two. The instructions to execute an update job may update a Base table and identify a set of View tables that are derived from, depend on, or are otherwise affected by the data appended to the Base table during the update. The identified set of View tables may then be submitted to the sorting algorithm and scheduled for execution in the same manner as the original update jobs.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram of selected elements of a prior art database system 100. Database system 100 is shown including conventional streaming data warehouse 102, which generally represents a database storage system, such as a relational database management system (RDBMS). As used herein, a "streaming data warehouse" refers to a type of database system that updates internal data objects while a data stream is arriving. As used herein, "data stream" represents a continuous incoming flow of new data to the streaming data warehouse. A data stream may include individual "update jobs," representing discrete update operations for appending received data onto internal data objects in the streaming data warehouse, rather than modifying, moving, or deleting data. Thus, an update job may represent an append-only operation. An update job may also be characterized as an atomic operation, that, once initiated, is not generally interrupted (i.e., not preempted) by the streaming data warehouse until completed. From a logical perspective, a typical streaming data warehouse may generally avoid preempting arriving update jobs, because interruption and resumption of individual update operations within an update job would involve additional processing resources. For example, keeping track of updated data and buffering pending data while an update job executes may require substantially more complexity and computing power than simply executing the update job without interruption. It is noted that update jobs may be continuously and/or continually received at the streaming data warehouse, which may be designed to immediately process the arriving update jobs, as will be described below. Update jobs may arrive at the streaming data warehouse in fixed or variable data intervals. The updating of internal data objects may include the updating of so-called "Base tables" (or "Base objects"), which directly receive the incoming new data, as well as the updating of so-called "View tables" (or "View objects"), which depend, either directly or indirectly, upon Base tables. Base tables and View tables may be collectively or generically referred to herein as database tables. It is noted that a View table may include a copy of data in a Base table, or may include a logical reference (e.g., a pointer) to the Base table. View tables may provide various layers of materialized views of received data (i.e., new data stored in Base tables) and/or derived data, such as data calculated using an arithmetic or a logical operation on received data. In various embodiments, the streaming data warehouse may execute executable code, such as a stored procedure, to generate a View table.

In FIG. 1, streaming data warehouse 102 includes data organized as data objects or structures, such as Base tables 110 and View tables 120, 122, 124 (referred to above as internal data objects) that may be linked to each other in meaningful relationships. For example, streaming data warehouse 102 may be organized as a number of different tables, such that each table defines a number of different data fields, referred to as columns in the table, and is populated with records of data (i.e., rows in the table). It is noted that streaming data warehouse 102 may represent any of a variety of database types, including very large and complex databases, or databases that include components that exist in different physical locations, also referred to as distributed databases. Streaming data warehouse 102 may be associated, or linked, with a database interface specification (not shown in FIG. 1), or other specification, which may represent a collection of rules, conventions, documentation, and/or other forms of specifying (or describing) a particular logical database implemented using streaming data warehouse 102. The database interface specification may further include a description or specification detailing how streaming data warehouse 102 may be accessed, for example, by using a query interface (not shown in FIG. 1) providing programmatic access for commands and data to and from streaming data warehouse 102. For example, streaming data warehouse 102 may be an RDBMS that is configured to use Structured Query Language (SQL) as the query interface.

As shown in FIG. 1, data streams 130 represent data arriving at streaming data warehouse 102 from an external source (not shown in FIG. 1). Data arriving via data streams 130 may thus represent update jobs (not shown in FIG. 1, see FIG. 2) that are constantly arriving and which imply a processing workload at streaming data warehouse 102. The processing involved with an arriving update job may include loading (i.e., appending) a Base table associated with the update job, as well as updating one or more View tables dependent on the Base table. The processing may further involve updating View tables dependent on other View tables. In streaming data warehouse 102, data stream 130-1 is shown in association with Base table 110-1 while data stream 130-2 is associated with Base table 110-2. View table 120 is depicted with a dependency to both Base table 110-1 and Base table 110-2, while View table 122 is shown as being dependent on View table 120. In this example, update jobs arriving via data streams 130-1, 130-2 may involve updating Base tables 110-1 and 110-2 and View tables 120 and 122. Data stream 130-3 is shown associated with Base table 110-3, on which View tables 124-1, 124-2 depend. Thus, an update job arriving via data stream 130-3 may cause an update operation on Base table 110-3 and View tables 124-1 and 124-2. It is noted that a given View table may depend on one Base table, such as View tables 124-1, 124-2, on more than one Base table, such as View table 120, or on another View table, such as View table 122. It will be understood that FIG. 1 is shown with a small number of data objects for the sake of clarity, and that various other configurations and arrangements of internal data objects may be implemented in a given instance of streaming data warehouse 102.

Figure 2:
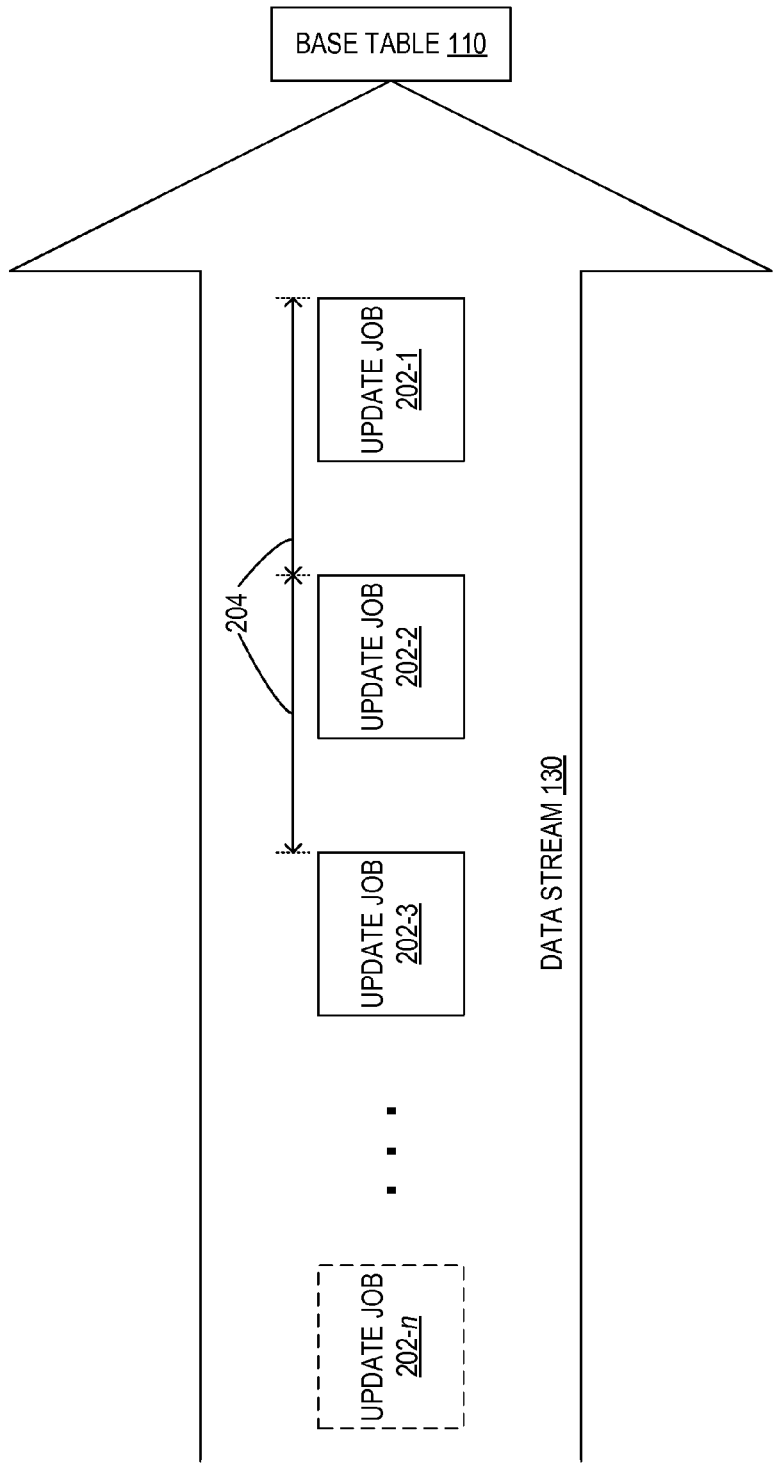
FIG. 2 is a block diagram illustrating operation of a database system according to the prior art.

Referring to FIG. 2, a block diagram of selected elements of an embodiment of prior art data stream 130 is shown. Data stream 130, as depicted in FIG. 2, is associated with Base table 110, to which update jobs 202 included in data stream 130 are directed. Data stream 130 may represent a continuous data stream comprised of a plurality of update jobs 202, represented by update jobs 202-1, 202-2, 202-3, and so on, up to update job 202-$n$, where n is an arbitrarily large number. Individual update jobs 202 may arrive separated by time interval 204, which may be a fixed or a variable time interval. It is further noted that update job 202 may include a given amount (or size) of arriving append data (not shown in FIG. 2) for Base table 110, which may be uniform or may be different for individual instances of update job 202. Thus, a variance in time interval 204, a variance in the size of update job 202, or a combination thereof, may introduce significant uncertainties in processing workload experienced by streaming data warehouse 102 (see FIG. 1). Since streaming data warehouse 102 is scaled to handle a large number of incoming data streams 130 with respective update jobs 202, variance in processing workload may cause undesired performance degradation, as will now be explained in further detail.

In operation of prior art streaming data warehouse 102, as illustrated in FIGS. 1 and 2, data streams 130 may continuously present arriving update jobs 202 for associated Base tables 110. Streaming data warehouse 102 may be configured to receive multiple data streams 130 from various sources, which may cause substantial performance issues. When a large number of update jobs arrive close together in time, processing capacity of streaming data warehouse 102 may become constrained, which may result in a significant backlog caused by overloading. The backlog, in turn, may cause unacceptable delays in the processing of continually arriving update jobs. Delays in processing arriving update jobs may reduce a desired performance of streaming data warehouse 102 by causing certain tables to remain longer in a state without recent updates, referred to herein as 'staleness' of the table. For a given table i at a current time t, staleness S(i) may be defined as:

$$S(i) = t - F(i) \quad \text{Equation (1)},$$

where F(i) represents a 'freshness' of table i given by a time of the most recent update to table i. Thus, to maintain a high value of freshness F(i) (i.e., a low value of staleness S(i)), streaming data warehouse 102 may be generally configured, at least in theory, to execute arriving update jobs 202 as fast as possible, e.g., immediately upon arrival. However, since streaming data warehouse 102 is not configured to schedule update jobs 202, optimal freshness may remain elusive because there is no ability to choose which data object among those with a high degree of staleness to update next. This operational scenario may be reflected in a persistent backlog of update jobs with a correspondingly high aggregate staleness of streaming data warehouse 102. When a backlog develops, queries from tables with a large staleness may return data that is no longer accurate, or up to date, which may detract from a desired performance and/or utility for which streaming data warehouse 102 was fundamentally designed to provide. Furthermore, a large staleness of data in streaming data warehouse 102 may cause additional problems and errors in downstream processing systems, which are dependent on streaming data warehouse 102, and which may expect consistency and high freshness. Such issues may, in turn, consume further resources and time to remediate. In summary, streaming data warehouse 102, having little or no ability to limit the number of data objects being updated simultaneously, may be subject to significant performance degradation due to transient overloading or certain unfavorable combinations of arriving update jobs 202. As a result, streaming data warehouse 102 may, in certain instances, reach a state of impairment that is no longer recoverable due to hardware failure or permanent overloading.

Figure 3:
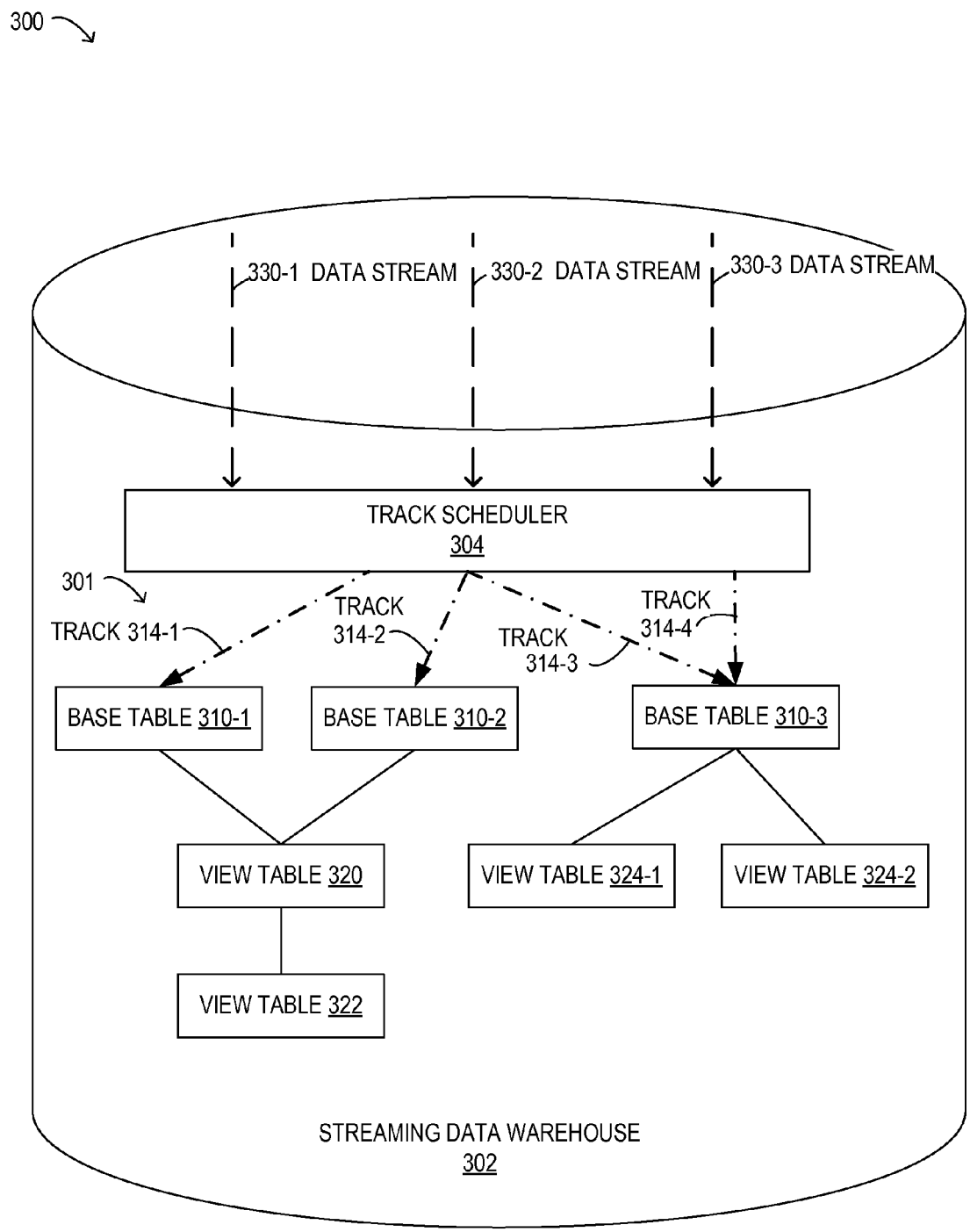
FIG. 3 is a block diagram of selected elements of an embodiment of a database system including track scheduling functionality as disclosed herein.

Turning now to FIG. 3, a block diagram of selected elements of an embodiment of a database system 300 including a streaming data warehouse 302 configured with a track scheduling system 301. Track scheduling system 301 as shown includes track scheduler 304 for scheduling update jobs (not shown in FIG. 3) according to the methods described herein. In FIG. 3, update jobs arrive as data streams 330 at streaming data warehouse 302 and are handled by track scheduling system 301. More specifically, arriving update jobs are received by track scheduler 304, which uses execution tracks 314 (also referred to herein as simply 'tracks') to handle the processing and execution of individual update jobs. Track 314 may represent a virtualized execution environment for update jobs based on processing resources available at streaming data warehouse 302. Track scheduler 304 may be configured to create, configure, reconfigure or eliminate tracks 314 in real time. Track scheduler 304 may individually allocate a portion of processing resources associated with streaming data warehouse 302 to a number of tracks 314. The processing resources assigned to track 314 may include a portion of available processor capacity (e.g., a maximum amount of processor utilization) and a portion of available memory (e.g., a maximum amount of memory). In this manner, track 314 may be dimensioned for varying processing capacity as desired. Base table 310 may then be associated with a given instance of track 314, referred to herein as the Base table's home track such that update jobs directed to Base table 310 are normally executed on respective track 314.

As depicted in FIG. 3, Base table 310-1 is assigned to track 314-1, Base table 310-2 is assigned to track 314-2, while Base table 310-3 is assigned to track 314-3. Track 314-4 may represent a reserve track that can be used to execute update jobs for any one or more Base tables and is shown in FIG. 3 currently sending an update job to Base table 310-3, along with track 314-3. After Base tables 310-1, 310-2 are updated with an update job, View tables 320, 322 may be updated according to their dependency to append data in the update job. Similarly, View tables 324-1, 324-2 may be updated in dependency to Base table 310-3. It will be understood that FIG. 3 is shown with a relatively small number of objects to preserve clarity, and that various other configurations and arrangements of internal data objects may be implemented in a given instance of streaming data warehouse 302. In addition, although the preceding discussion refers to home tracks in conjunction with Base tables, a View table may also be assigned to a home track.

Base table 310 and View table 320 may be assigned a priority value relative to other tables within streaming data warehouse 302. When certain Base tables have a higher priority, their update jobs (referred to herein as 'high-priority update jobs') may be scheduled by track scheduler 304 ahead of update jobs associated with lower priority Base tables (referred to herein as low-priority update jobs'). In certain instances, a long execution time for the low-priority update jobs may lead to unacceptable delays in updating associated Base tables (or View tables). Tracks 314 provide a mechanism for track scheduler 304 to choose which Base table 310 receives the next update job and also what portion of the available processing capacity for executing update jobs is allocated to Base table 310.

Figure 4:
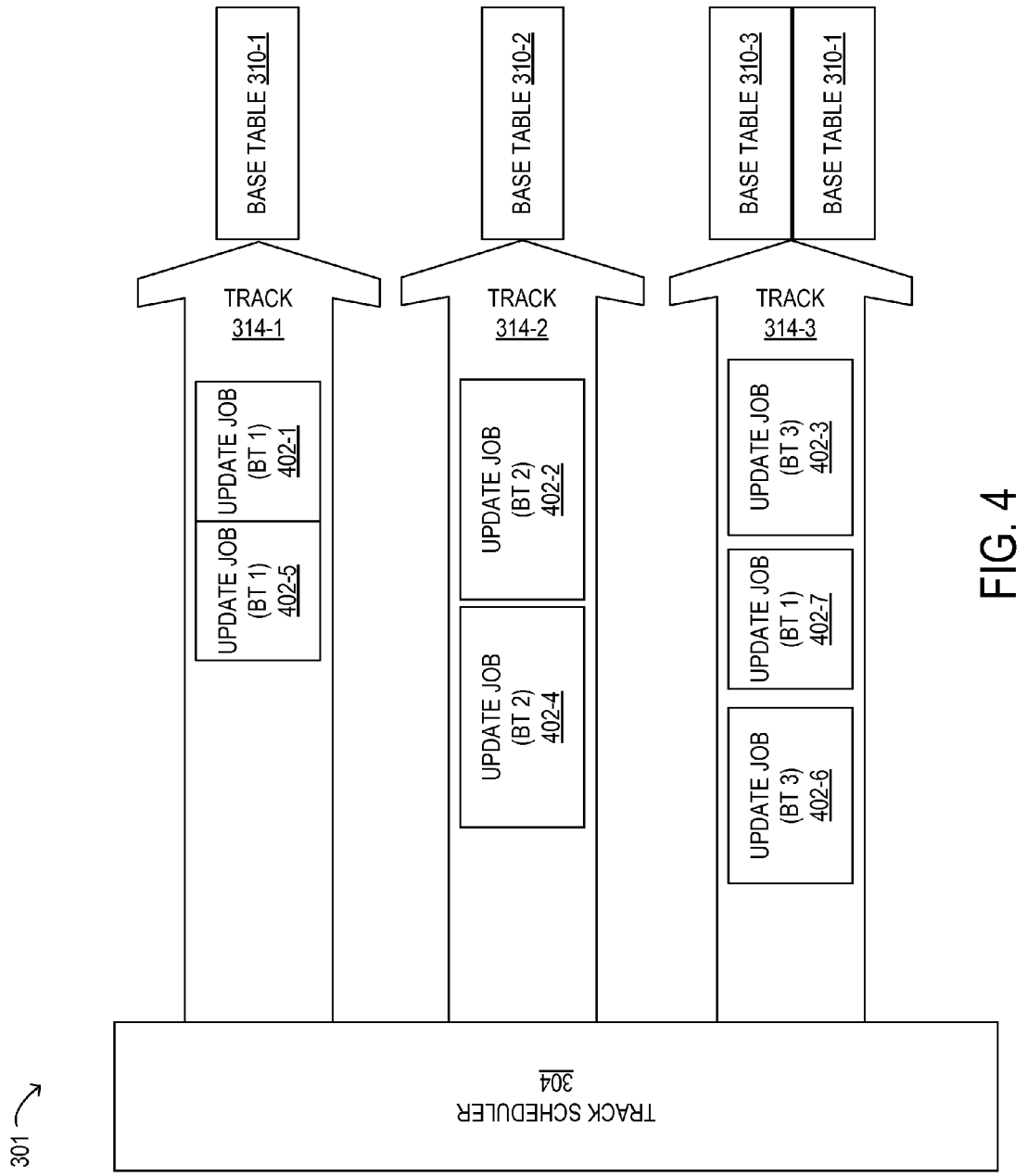
FIG. 4 is a block diagram illustrating selected operational aspects of an embodiment of the database system of FIG. 3.

Advancing now to FIG. 4, a block diagram of selected elements of an embodiment of track scheduling system 301 is shown. Track scheduling system 301, as shown, includes track scheduler 304, which is configured to dispatch update jobs 402 to tracks 314. In FIG. 4, update jobs 402 is assigned to Base tables 310. For example, update jobs 402-1, 402-5, and 402-7 are assigned to BT 1 (Base table 310-1); update jobs 402-2, 402-4 are assigned to BT 2 (Base table 310-2); and update jobs 402-3, 402-6 are assigned to BT 3 (Base table 310-3). Upon arrival at track scheduler 304, update job 402 is normally dispatched to track 314 corresponding to assigned Base table 310. However, track scheduler 304 may dispatch update 402 to a different track for optimal scheduling and to reduce staleness of data within streaming data warehouse 302 (see FIG. 3). In the embodiment shown in FIG. 4, update job 402-7 has been dispatched to track 314-3, which is normally associated with Base table 310-3, but still may be used to execute update job 402-7 on Base table 310-1. In other embodiments, track scheduler 304 may dispatch update job 402 to a different instance of track 314, including instances of track 314 that may not yet be assigned to Base table 310.

In operation of streaming data warehouse 302, with reference to FIGS. 3 and 4, a number of instances of data stream 330 may result in a large number of update jobs 402 arriving at streaming data warehouse 302. Update jobs 402 are individually directed to a specific instance of Base table 310 and associated View tables (when so configured). Track scheduler 304 may receive update jobs 402 and dispatch them to a given one of track 314, which has previously been allocated for a given portion of processor utilization and memory. Update jobs 402 that have arrived at track scheduler 304, but have not yet been dispatched to track 314 are referred to herein as "received" update jobs that have been received from data stream 330. Update jobs 402 that have been dispatched to track 314 are also referred to herein as "pending" (or "dispatched") update jobs that are pending execution. Update job 402 is referred to as an "executed" update job when the append data has been written to designated data objects (Base tables and View tables). Certain tracks 314 may be associated with a given Base table 310. During normal operation, track scheduler 304 may assign update job 402 to track 314 that has been assigned to Base table 310, to which update job 402 is directed. However, for scheduling purposes, track scheduler 304 may implement various rules and/or algorithms to reassign update job 402 to a different one of tracks 314 for execution.

Furthermore, track scheduler 304 may employ additional processing of update jobs 402. For example, track scheduler 304 may sort arriving update jobs 402 according to a sorting algorithm and dispatch sorted update jobs 402 to tracks 314 in a sorted order. The sorting algorithm may use any of various conditions or parameters to determine the sorted order. The sorting algorithm may sort update jobs according to various aspects associated with the update job, including, but not limited to: with respect to corresponding Base table priorities, with respect to an amount of data, with respect to an expected processing effort, with respect to an expected execution time, with respect to a corresponding Base table freshness/staleness, or a combination thereof. In one embodiment, the priority and staleness of Base table 310 associated with update job 402 may be used by the sorting algorithm to decide which received update job is next in line for dispatching to track 314. It is noted that in certain embodiments, pending update jobs that have already been dispatched may be sorted or rearranged according to a sorting algorithm, when operational conditions permit. In addition, although the preceding discussion refers to the sorting algorithm in terms of Base table update jobs only, the sorting algorithm may not be limited to sorting Base tables update jobs only and may also receive and sort update jobs for View tables, as discussed below with respect to FIG. 5.

After being dispatched, pending update jobs may wait for execution in a track. In order to reduce the number of pending update jobs, pending update jobs directed to common Base tables or to common View tables may be combined into a single update job. In this manner, the staleness of the common Base tables and/or View tables may be further reduced. As noted above, streaming data warehouse 302 may experience periods of transient overloading, during which high-priority update jobs may be advanced ahead of low-priority update jobs by track scheduler 304. The low-priority update jobs may collect and become combined into large low-priority jobs, which may then prevent newer high-priority update jobs from executing. In this situation, combined low-priority update jobs may be separated into their component low-priority update jobs, which may permit newer high-priority update jobs to continue to be executed. It is noted that this arrangement does not violate the atomic nature of update jobs and does not preempt the execution of update jobs.

Figure 5:
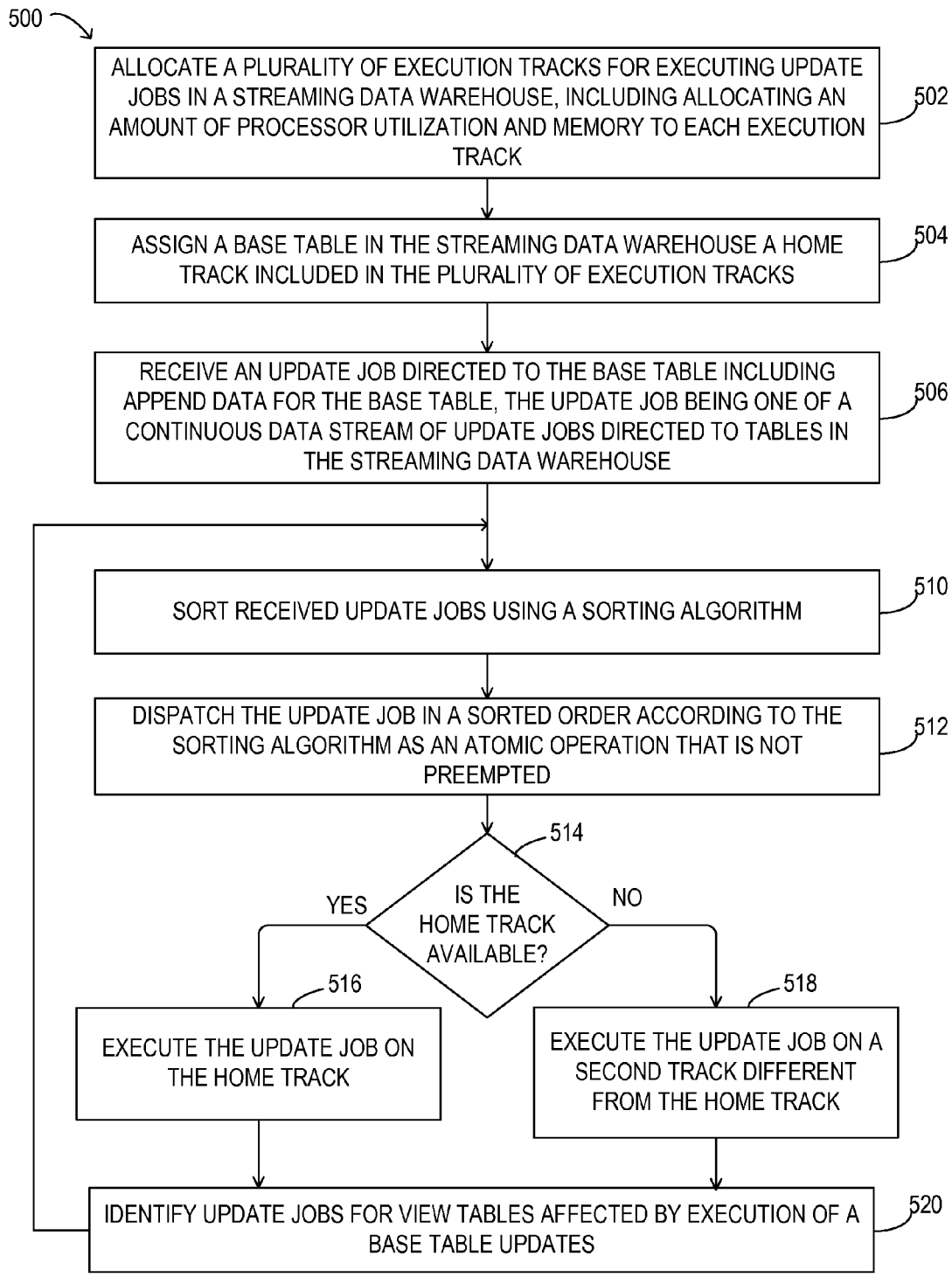
FIG. 5 is a block diagram of selected elements of an embodiment of an update job scheduling process.

Turning now to FIG. 5, an embodiment of method 500 for scheduling update jobs in a streaming data warehouse is illustrated in flow chart form. Method 500 may represent an algorithm used by track scheduling system 301 included in streaming data warehouse 302 (see FIGS. 3, 4). Method 500 may also represent functionality provided by track scheduler 714 executing on computing device 700 (see FIG. 7). It is noted that certain operations described in method 500 may be optional or may be rearranged in different embodiments.

Method 500 may begin by allocating (operation 502) a plurality of execution tracks for executing update jobs in a streaming data warehouse, including allocating an amount of processor utilization and memory to each execution track. The amount of processor utilization and memory allocated to each execution track may be varied according to expected attributes of arriving update jobs and/or an internal structure of the streaming data warehouse. A Base table in the streaming data warehouse may be assigned (operation 504) a home track included in the plurality of execution tracks. Operation 504 may be repeated for a number of Base tables in the streaming data warehouse (not shown in FIG. 5). Operation 502 and/or operation 504 may be performed prior to receiving update jobs from a continuous data stream to the streaming data warehouse. An update job directed to the Base table, including append data for the Base table, may be received (operation 506) as one of a continuous data stream of update jobs directed to tables in the streaming data warehouse. The amount (i.e., size) of the append data included in the update job may vary. The received update jobs may be sorted (operation 510) according to a sorting algorithm. The sorting algorithm may sort update jobs according to various aspects associated with the update job, as mentioned previously. The update job may be dispatched (operation 512) in a sorted order according to the sorting algorithm as an atomic operation that is not preempted.

A decision may then be made whether the home track is available (operation 514). The availability of the home track may be determined by comparing an expected execution delay for the home track to a predetermined threshold. The execution delay may be determined based on a number of update jobs pending in the execution track, an amount of append data pending in the execution track, the priority of a Base table associated with the execution track, or a combination thereof. When the result of operation 514 is YES, then the update job may be executed (operation 516) on the home track. When the result of operation 514 is NO, then the update job may be executed (operation 518) on a second track different from the home track. The second track may be selected based on a workload associated with the second track, a portion of processor utilization assigned to the second track, a portion of memory assigned to the second track, or a combination thereof. The execution of a Base table update job may necessitate additional update jobs to update View tables that have a dependence on append data added to the Base table. In some embodiments, method 500 includes identifying (operation 520) any update jobs for View tables affected by the execution of a Base table update in operations 516 or 518. As depicted in FIG. 5, any update jobs identified in operation 520 are provided to the sorting algorithm to be sorted (operation 510) and dispatched for execution (operation 512) in the same manner as Base table update jobs.

Figure 6:
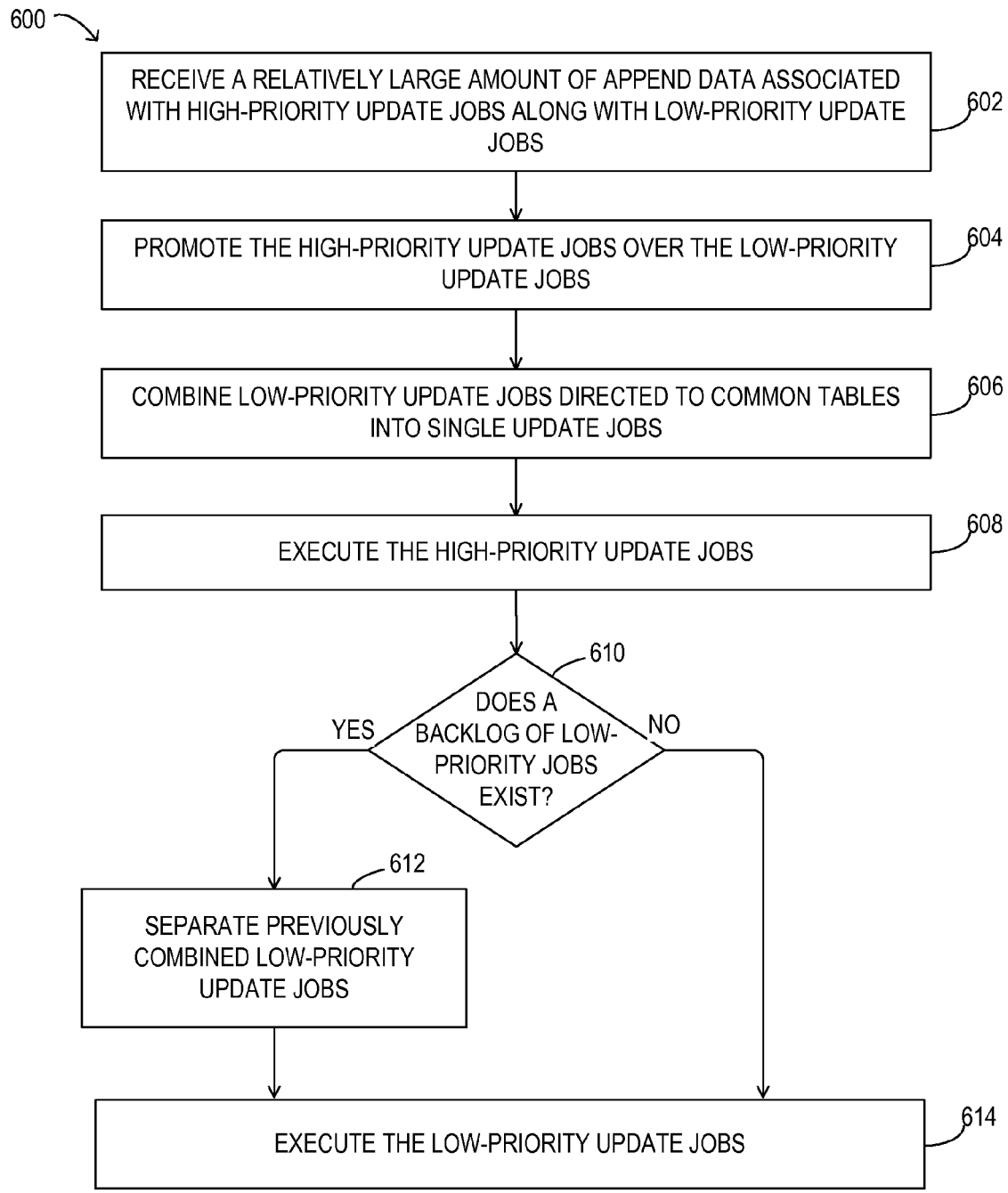
FIG. 6 is a block diagram of selected elements of an embodiment of an update job scheduling process.

Turning now to FIG. 6, an embodiment of method 600 for scheduling update jobs in a streaming data warehouse is illustrated in flow chart form. Method 600 may represent an algorithm used by track scheduling system 301 included in streaming data warehouse 302 (see FIGS. 3, 4). Method 600 may also involve functionality provided by track scheduler 714 executing on computing device 700 (see FIG. 7). It is noted that certain operations described in method 600 may be optional or may be rearranged in different embodiments.

A relatively large amount of append data associated with high-priority update jobs may be received (operation 602) along with low-priority update jobs. The high-priority update jobs may be promoted (operation 604) over the low-priority update jobs. The result of operation 604 may be that no low-priority update jobs are dispatched for execution, or that the low-priority update jobs remain pending. Low-priority update jobs directed to common tables may be concatenated or otherwise combined (operation 606) into single update jobs. The high-priority update jobs may be executed (operation 608). Operations 606 and/or 608 may be repeated or be sustained until the high-priority update jobs have been executed. Then, in method 600, a decision may be made whether a backlog of low-priority update jobs exists (operation 610). When the result of operation 610 is YES, then previously combined low-priority update jobs may be separated (operation 612) on the home track. If the result of operation 610 is NO, or after operation 612, then the low-priority update jobs may be executed (operation 614).

Figure 7:
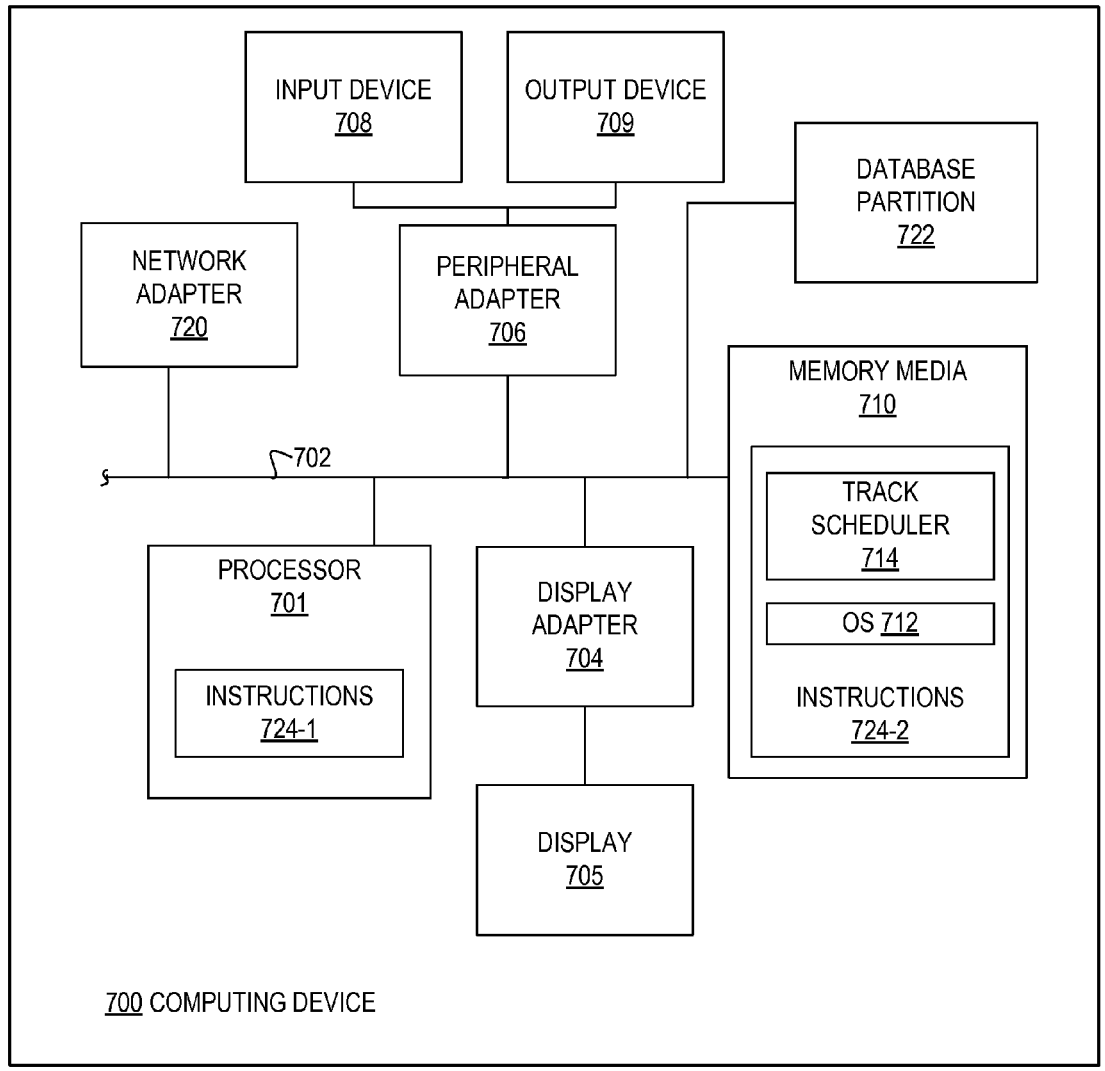
FIG. 7 is a block diagram of selected elements of an embodiment of a computing device.

Referring now to FIG. 7, a block diagram illustrating selected elements of an embodiment of a computing device 700 for track scheduling of update jobs in a streaming data warehouse is presented. In the embodiment depicted in FIG. 7, device 700 includes processor 701 coupled via shared bus 702 to storage media collectively identified as memory media 710.

Device 700, as depicted in FIG. 7, further includes network adapter 720 that interfaces device 700 to a network (not shown in FIG. 7). In embodiments suitable for use in database systems, device 700, as depicted in FIG. 7, may include peripheral adapter 706, which provides connectivity for the use of input device 708 and output device 709. Input device 708 may represent a device for user input, such as a keyboard or a mouse, or even a video camera. Output device 709 may represent a device for providing signals or indications to a user, such as loudspeakers for generating audio signals.

Device 700 is shown in FIG. 7 including display adapter 704 and further includes a display device or, more simply, a display 705. Display adapter 704 may interface shared bus 702, or another bus, with an output port for one or more displays, such as display 705. Display 705 may be implemented as a liquid crystal display screen, a computer monitor, a television or the like. Display 705 may comply with a display standard for the corresponding type of display. Standards for computer monitors include analog standards such as video graphics array (VGA), extended graphics array (XGA), etc., or digital standards such as digital visual interface (DVI), high definition multimedia interface (HDMI), among others. A television display may comply with standards such as National Television System Committee (NTSC), Phase Alternating Line (PAL), or another suitable standard. Display 705 may include an output device 709, such as one or more integrated speakers to play audio content, or may include an input device 708, such as a microphone or video camera.

Memory media 710 encompasses persistent and volatile media, fixed and removable media, and magnetic and semiconductor media. Memory media 710 is operable to store instructions, data, or both. Memory media 710 as shown includes sets or sequences of processor executable instructions 724-2, namely, an operating system 712 and track scheduler 714. Operating system 712 may be a UNIX or UNIX-like operating system, a Windows® family operating system, or another suitable operating system. Instructions 724 may also reside, completely or at least partially, within processor 701 during execution thereof. It is further noted that processor 701 may be configured to receive instructions 724-1 from instructions 724-2 via shared bus 702. In some embodiments, memory media 710 is configured to store and provide executable instructions for executing track scheduler 714, as mentioned previously. For example, track scheduler 714 may be configured to execute method 500 and/or method 600. In certain embodiments, computing device 700 may represent an implementation of track scheduler 304, streaming data warehouse 302 (see FIGS. 3, 4), or a combination thereof. In various embodiments, network adapter 720 may be used to access streaming data warehouse 302 (see FIG. 3). Also included in device 700 is database partition 722, which may represent an instance of streaming data warehouse 302, and which may be coupled to processor 701 via shared bus 702. In certain embodiments, track scheduler 714 may access database partition 722 for performing track scheduling, according to the methods described herein.

To the maximum extent allowed by law, the scope of the present disclosure is to be determined by the broadest permissible interpretation of the following claims and their equivalents, and shall not be restricted or limited to the specific embodiments described in the foregoing detailed description.

The invention claimed is:

1. A method, comprising:
   allocating, in memory, a plurality of execution tracks, with each execution track in the plurality of execution tracks assigned a portion of utilization of a processor and a proportionate portion of the memory;
   defining, by the processor, a home track in the plurality of execution tracks;
   receiving, by the processor, an update job for a database table stored in the memory, wherein the update job comprises append data for the database table;
   determining, by the processor, that the home track is unavailable;
   selecting, by the processor, one of the plurality of execution tracks that is different from the home track; and
   dispatching, by the processor, the update job for execution on the one of the plurality of execution tracks.

2. The method according to claim 1, further comprising determining that the home track is available.

3. The method according to claim 1, further comprising executing the update job when the home track is available.

4. The method according to claim 1, further comprising determining a priority of the update job.

5. The method according to claim 1, further comprising sorting the update job according to an execution time in the processor.

6. The method according to claim 1, further comprising selecting the one of the plurality of execution tracks based on the portion of utilization of the processor.

7. The method according to claim 1, further comprising selecting the one of the plurality of execution tracks based on the proportionate portion of the memory.

8. A system, comprising:
   a processor; and
   a memory storing code that when executed causes the processor to perform operations, the operations comprising:
   allocating a plurality of execution tracks in the memory, with each execution track in the plurality of execution tracks assigned a portion of utilization of the processor and a proportionate portion of the memory;
   defining a home track in the plurality of execution tracks;
   receiving an update job for a database table stored in the memory, wherein the update job comprises append data for the database table;
   determining that the home track is unavailable;
   selecting one of the plurality of execution tracks that is different from the home track; and
   dispatching the update job for execution on the one of the plurality of execution tracks.

9. The system according to claim 8, wherein the operations further comprise determining that the home track is available.

10. The system according to claim 8, wherein the operations further comprise executing the update job when the home track is available.

11. The system according to claim 8, wherein the operations further comprise determining a priority of the update job.

12. The system according to claim 8, wherein the operations further comprise sorting the update job according to an execution time in the processor.

13. The system according to claim 8, wherein the operations further comprise selecting the one of the plurality of execution tracks based on the portion of utilization of the processor.

14. The system according to claim 8, wherein the operations further comprise selecting the one of the plurality of execution tracks based on the proportionate portion of the memory.

15. A memory storing code that when executed causes a processor to perform operations, the operations comprising:
   allocating a plurality of execution tracks in the memory, with each execution track in the plurality of execution tracks assigned a portion of utilization of the processor and a proportionate portion of the memory;
   defining a home track in the plurality of execution tracks;
   receiving an update job for a database table stored in the memory, wherein the update job comprises append data for the database table;
   determining that the home track is unavailable;
   selecting one of the plurality of execution tracks that is different from the home track; and
   dispatching the update job for execution on the one of the plurality of execution tracks.

16. The memory according to claim 15, wherein the operations further comprise determining that the home track is available.

17. The memory according to claim 15, wherein the operations further comprise executing the update job when the home track is available.

18. The memory according to claim 15, wherein the operations further comprise determining a priority of the update job.

19. The memory according to claim 15, wherein the operations further comprise sorting the update job according to an execution time in the processor.

20. The memory according to claim 15, wherein the operations further comprise selecting the one of the plurality of execution tracks based on the portion of utilization of the processor.

* * * * *